H. E. RIEHL.
AMUSEMENT APPARATUS.
APPLICATION FILED JULY 22, 1916. RENEWED AUG. 25, 1917.

1,242,865.

Patented Oct. 9, 1917.
3 SHEETS—SHEET 1.

WITNESSES

INVENTOR
Henry E. Riehl
BY
ATTORNEYS

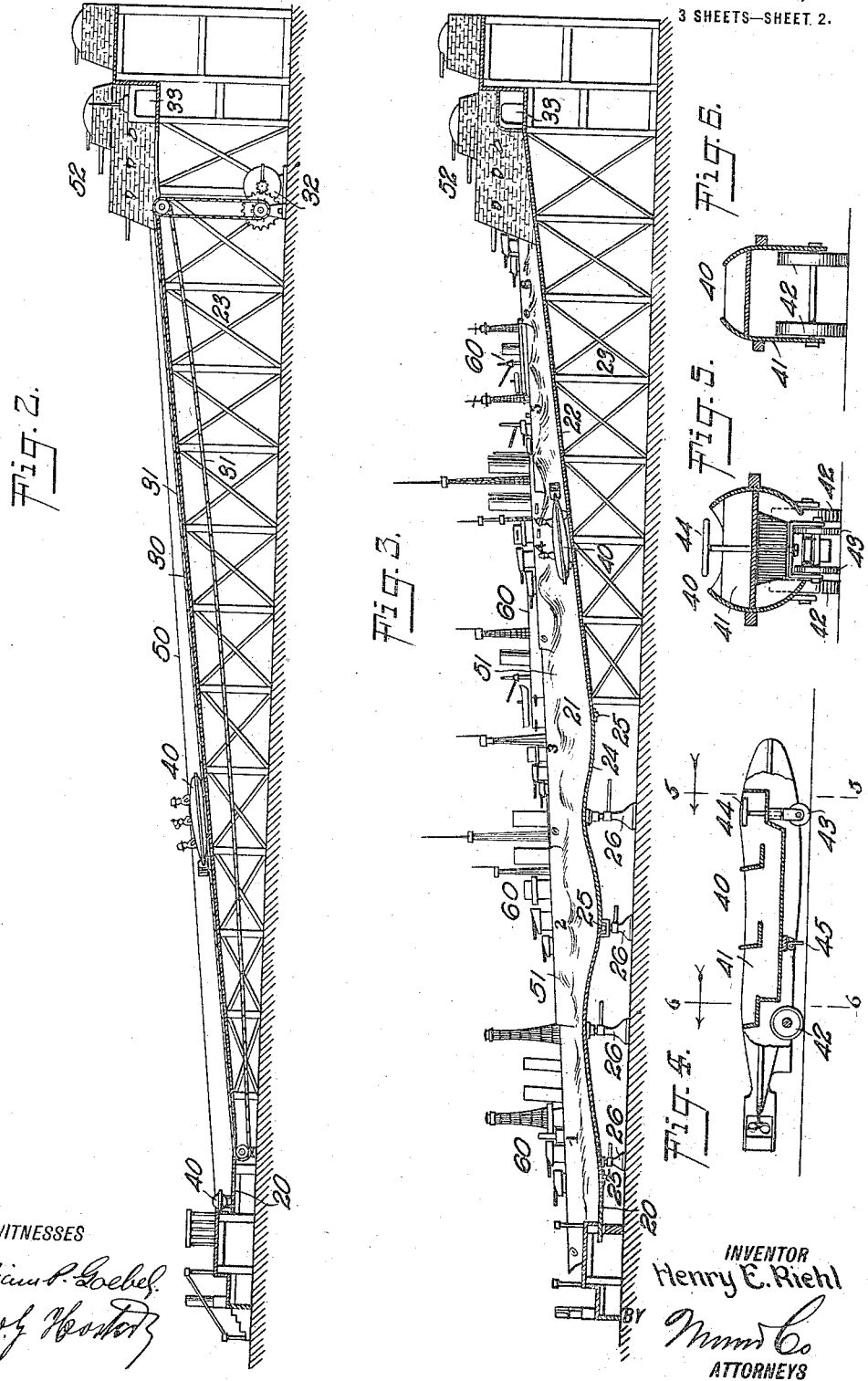

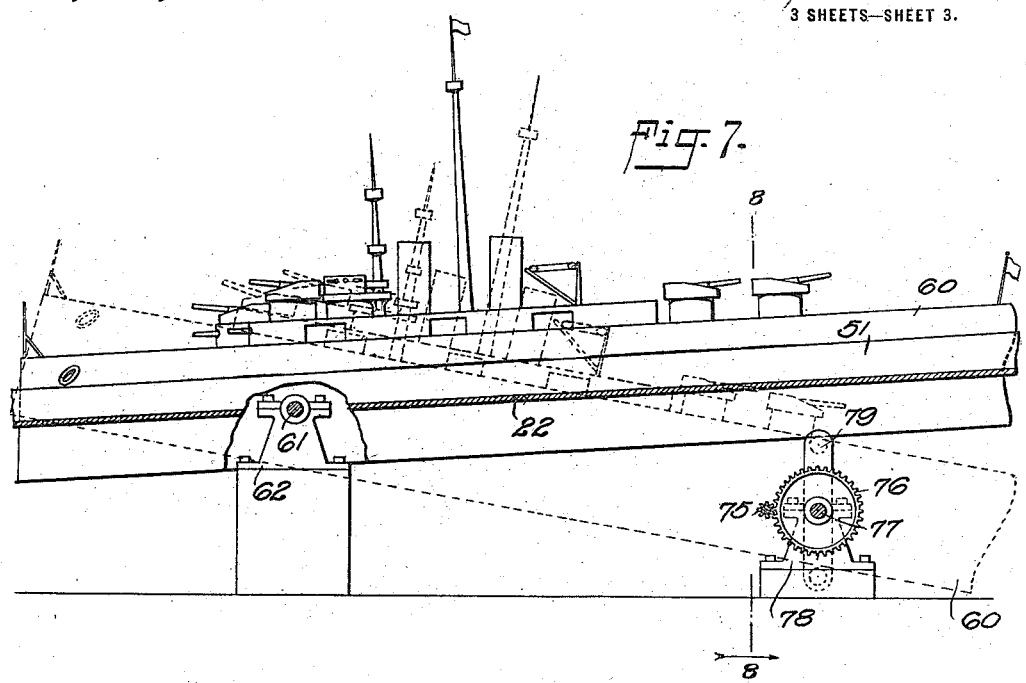
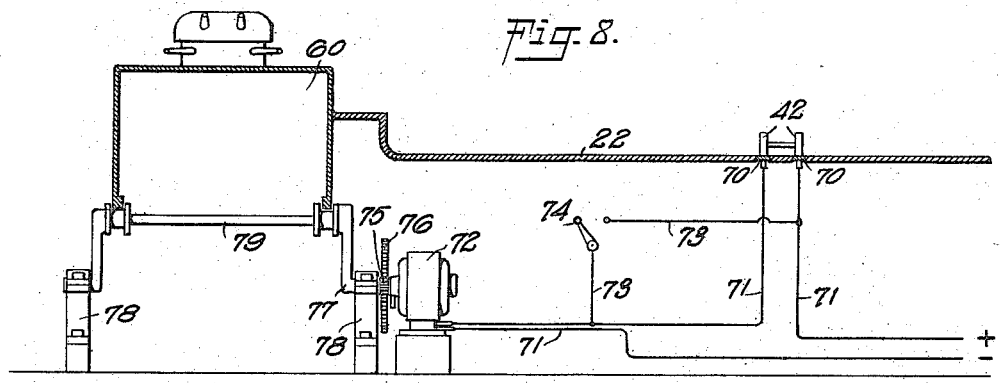
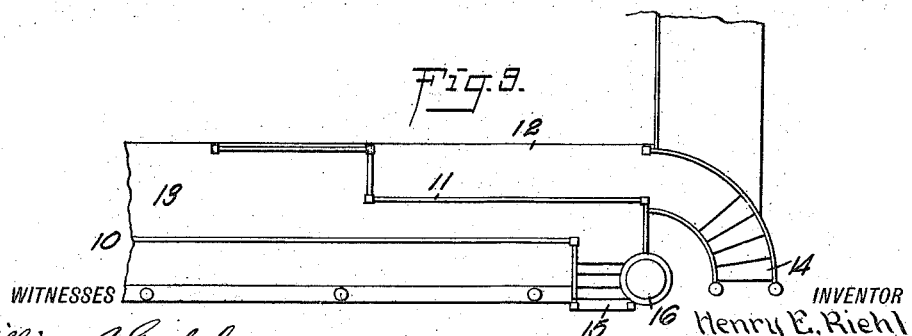

UNITED STATES PATENT OFFICE.

HENRY ELMER RIEHL, OF BROOKLYN, NEW YORK.

AMUSEMENT APPARATUS.

1,242,865.      Specification of Letters Patent.      Patented Oct. 9, 1917.

Application filed July 22, 1916, Serial No. 110,652. Renewed August 25, 1917. Serial No. 188,189.

*To all whom it may concern:*

Be it known that I, HENRY E. RIEHL, a citizen of the United States, and a resident of the city of New York, borough of Brooklyn, in the county of Kings and State of New York, have invented new and useful Improvements in Amusement Apparatus, of which the following is a full, clear, and exact description.

The invention relates to amusement apparatus having passenger carrying vehicles traveling over a prepared course.

The object of the invention is to provide a new and improved amusement apparatus, more especially designed for use in pleasure resorts, exhibition grounds, parks and other places and arranged to provide an exhilerating pleasure ride for the passengers and at the same time enable the steerer of a car to display skill with a view to provide additional excitement and pleasure.

In order to accomplish the desired result, use is made of a vehicle, a surface for the said vehicle to travel on, an object arranged adjacent the said surface, a motor for actuating the said object, and connecting means on the said surface and connected with the said motor, the said connecting means being adapted to be engaged by the said vehicle to start the motor and thereby actuate the said object.

A practical embodiment of the invention is represented in the accompanying drawings forming a part of this specification, in which similar characters of reference indicate corresponding parts in all the views.

Figure 1 is a perspective view of the amusement apparatus;

Fig. 2 is a transverse section of the same on the line 2—2 of Fig. 1 and showing more particularly the uptrack;

Fig. 3 is a longitudinal section on line 3—3 of Fig. 1, and showing more particularly the inclined surface and the parts to be actuated;

Fig. 4 is an enlarged sectional side elevation of a car;

Fig. 5 is an enlarged cross section of the same on the line 5—5 of Fig. 4;

Fig. 6 is a similar view of the same on the line 6—6 of Fig. 4;

Fig. 7 is a cross section of one of the parts to be actuated and the means employed for actuating the object, parts being shown in section;

Fig. 8 is a sectional front view of the same together with part of the inclined surface provided with contact plates; and Fig. 9 is a plan view of the platform end of the amusement apparatus.

On the front end of the amusement apparatus is arranged a platform 10 divided by a railing 11 into an embarkation station 12 and a disembarkation station 13. Steps 14 lead to the embarkation station 12 and steps 15 lead from the disembarkation station 13, and a ticket office 16 is preferably located between the stairs 14 and 15, as plainly indicated in Fig. 1. Adjacent the inner edge of the platform 10 and a distance below the same is arranged a horizontal landing 20 forming part of an inclined surface 21, of which the upper portion 22 is flat and is permanently mounted on a suitable framework 23 (see Fig. 3), and the lower portion is made in sections 24 connected with each other and with the lower end of the flat portion 22 and the landing 20 by hinges 25. The sections 24 are made of sheet metal or other flexible material and are engaged at the underside by suitable jacks 26 for bending or corrugating the sections 24 to give the same a wavy appearance, as will be readily understood by reference to Figs. 1 and 3. It is understood that the corrugations extend from side to side so as to provide alternate hills and dales.

The right-hand side of the landing 20 leads to the lower end of a track 30 inclined upwardly and rearwardly and having an endless carrier chain 31 driven from a suitable motor 32, as plainly shown in Fig. 2. The upper end of the track 30 leads to a tunnel 33 which opens onto the upper end of the flat portion 22 of the inclined surface 21 at or near the middle thereof, as plainly indicated in Fig. 1. Cars 40 are adapted to travel from the landing 20 onto the track 30 to be carried up the same by the endless chain 31 and to finally pass through the tunnel 33 onto the upper end of the inclined surface 21 to travel down the same by its own weight. The car on traveling the corrugated lower portion of the inclined surface follows the curvature thereof thus providing an exhilarating ride for the occupants of the car.

Each of the cars 40 is provided with a body 41, preferably given the form of a torpedo, mounted on spaced rear wheels 42 and provided with front steering wheels 43 under the control of the occupant of the front seat of the body 41 by the use of a steering wheel 44 to enable such occupant to steer the vehicle down the inclined surface 21 to the landing 20 at the disembarkation station 13. The under side of the body 41 is provided with a pivoted plate 45 adapted to be engaged by a tooth on the endless chain 31 to draw the car 40 up the inclined track 30.

The inclined surface 21 is separated from the track 30 by a wall 50, and a similar wall 51 is erected on the other side of the inclined surface 21. At the upper portion of the inclined surface 21 is the representation of a fort, as indicated in Fig. 1. To the right of the track 30 and to the left of the wall 51 are arranged a series of movable objects 60, preferably representations of battleships, as plainly indicated in the drawings. The objects 60 are normally dormant but are movable and the movement of the objects is controlled by the car 40 during its travel downward on the flat upper portion 22 of the inclined surface 21. For this purpose the following arrangement is made: In the front portion 22 of the inclined surface 21 are arranged pairs of contacting plates 70, preferably flush with the surface and disposed transversely. The pairs of plates 70 are spaced apart and the plates of each pair of plates are spaced apart according to the rear wheels 42 of the car 40 so that when the car 40 travels down the flat portion 22 the helmsman of the car can steer the same so that the rear wheels 42 simultaneously make contact with a pair of contact plates 70. The number of pairs of contact plates 70 correspond to the number of objects 60, and the pairs of contact plates and the objects are provided with corresponding indicating characters, preferably numerals, as shown in the drawings, so that the person in charge of a car 40 can select any one of the pairs of plates he desires to make contact with in order to actuate a corresponding object 60. Each pair of contact plates 70 is in an electric circuit 71 connected with a suitable source of electrical energy and with an electric motor 72. A switch circuit 73 is connected with the motor circuit 71 and is provided with a switch 74 normally open, as plainly shown in Fig. 8. On the shaft of the motor 72 is secured a pinion 75 in mesh with a gear wheel 76 secured on a crank shaft 77 journaled in suitable fixed bearings 78. The crank arm 79 of the crank shaft 77 supports the bottom of an object 60 near one end thereof, the said object being pivoted near its other end on a suitable shaft 61 journaled in fixed bearings 62 so that the object 60 is free to swing up or down.

Normally the motors 72 for the several objects 60 are not running and the objects 60 are in uppermost position. Now in case the downwardly traveling car 40 connects a pair of contact plates 70 with each other by the hind wheels 42 when the circuit 71 is closed and the motor 72 is started whereby a slow motion is given to the crank shaft 77 whereby the crank arm 79 imparts a downward swinging movement to one end of the object 60 so that the latter appears in motion. As soon as the rear wheels 42 move out of engagement with the pair of contact plates 70 the electric circuit 71 is broken and the motor 72 comes to a stop with the object 60 in lowermost position. When it is desired to subsequently swing the object 60 back to its raised position, the operator temporarily closes the switch 74 so that the motor 72 is again started and is kept running until the crank arm 79 again assumes an uppermost position, after which the switch 74 is swung back into open position. It will be noticed that in case the objects 60 represent battleships it appears to the onlookers that the battleship actuated at the time is sinking thus heightening the effect. The wall 51 is preferably bent on its inner face to represent waves, as indicated in Fig. 3.

From the foregoing it will be seen that the helmsman of a car can select the pair of contact plates he desires to connect by the rear wheels of the car so that the corresponding object 60 is actuated in the manner above described, or, in other words, the helmsman can select the battleship he desires to sink during the desired passage of the car on the flat portion 22 of the inclined surface 21.

It will also be seen that by the arrangement described the passengers in the car are not only provided with an exhilarating pleasure ride but at the same time the helmsman can display skill with a view to provide additional excitement by causing one of the objects to be actuated as above explained.

Having thus described my invention, I claim as new and desire to secure by Letters Patent:

1. An amusement apparatus comprising an inclined surface having electrical contacts fixed thereon, a movable object arranged adjacent to said surface, electrical connections between said contacts and object, a vehicle adapted to travel down said surface by its own weight, said vehicle being also adapted for engagement with said contacts, a motor in the circuit of said object and contacts and adapted to actuate the object when the circuit is closed, as shown and described.

2. An amusement apparatus, comprising a wheeled vehicle having steering means, an inclined surface for the said vehicle to travel down by its own weight and adapted to be steered by an occupant of the vehicle during the latter's travel down the said inclined surface, a series of objects arranged adjacent the said inclined surface, motors for actuating the said objects, and electric circuits for the said motors and having pairs of contact plates on the said inclined surface, the said vehicle forming a circuit closer on simultaneously engaging a pair of the said contact plates to close the circuit for the corresponding motor to start the latter and thereby actuate the corresponding object.

3. An amusement apparatus, comprising a wheeled vehicle having steering means, an inclined surface for the said vehicle to travel down by its own weight and adapted to be steered by an occupant of the vehicle during the latter's travel down the said inclined surface, a series of objects arranged adjacent the said inclined surface, motors for actuating the said objects, electric circuits for the said motors and having pairs of contact plates on the said inclined surface, the said vehicle forming a circuit closer on simultaneously engaging a pair of the said contact plates to close the circuit for the corresponding motor to start the latter and thereby actuate the corresponding object, and pairs of indicating characters, of which one of a pair is associated with a pair of contact plates and the other of this pair is associated with the corresponding object.

4. An amusement apparatus, comprising a vehicle having connected rear wheels and a front steering wheel, an inclined surface for the said vehicle to travel down by its own gravity and adapted to be steered by an occupant of the vehicle during its downward journey on the inclined surface, a series of movable objects arranged adjacent the said inclined surface, motors for actuating the said objects, and electric circuits for the said motors and each having a pair of contact plates embedded in the said inclined surface, the said contact plates of a pair being spaced apart to correspond to the rear wheels of the vehicle whereby the said vehicle becomes a circuit closer on the rear wheels simultaneously engaging a pair of contact plates.

In testimony whereof I have signed my name to this specification in the presence of two subscribing witnesses.

HENRY ELMER RIEHL.

Witnesses:
ROBERT W. SEATON,
CHAS. J. GEISER.

Copies of this patent may be obtained for five cents each, by addressing the "Commissioner of Patents, Washington, D. C."